United States Patent [19]
Van Der Wal

[11] Patent Number: 5,745,478
[45] Date of Patent: Apr. 28, 1998

[54] ATM POLICING DEVICE

[75] Inventor: Jacob Cornelis Van Der Wal, Ve Delft, Netherlands

[73] Assignee: Koninklijke PTT Nederland N.V., Groningen, Netherlands

[21] Appl. No.: 615,625

[22] Filed: Mar. 13, 1996

[30] Foreign Application Priority Data

Mar. 27, 1995 [NL] Netherlands ............... 9500585

[51] Int. Cl.$^6$ .................. H04L 12/26; H04L 12/56
[52] U.S. Cl. ........................ 370/234; 370/409
[58] Field of Search ................. 370/229, 230, 370/232, 233, 234, 235, 252, 409; 395/200.06

[56] References Cited

U.S. PATENT DOCUMENTS

| | | | |
|---|---|---|---|
| 4,769,810 | 9/1988 | Eckberg, Jr. | 370/232 |
| 5,007,043 | 4/1991 | van den Dool | 370/232 |
| 5,224,091 | 6/1993 | Brandt | 370/235 |
| 5,224,092 | 6/1993 | Brandt | 370/232 |
| 5,267,232 | 11/1993 | Katsube et al. | 370/230 |
| 5,361,252 | 11/1994 | Sallberg et al. | 370/230 |
| 5,546,389 | 8/1996 | Wippenbeck et al. | 370/412 |

FOREIGN PATENT DOCUMENTS

| | | |
|---|---|---|
| 0 416 685 A1 | 3/1991 | European Pat. Off. . |
| 0 596 159 A1 | 5/1994 | European Pat. Off. . |
| A-94/11975 | 5/1994 | European Pat. Off. . |

OTHER PUBLICATIONS

L.G. Cuthbert & J.C. Sapanel; "ATM–The Broadband Telecommunications Solution" 1993, The Institution of Electrical Engineers, London, UK, p. 11, Line 25, p. 12, Line 7; Figure 2.4.

V.F. Hartanto et al; User–Network Policer: A New Approach for ATM Congestion Control; Mar. 28, 1993; pp. 376–383; 1993 IEEE.

*Primary Examiner*—Hassan Kizou
*Attorney, Agent, or Firm*—Frishauf, Holtz, Goodman, Langer & Chick

[57] ABSTRACT

An admission device for admitting data cells having VC codes, to a transmission medium, includes a device for reading out the VC code of an arriving data cell, a device for comparing a count value, which is a measure of the load of the data cell with the read out VC code, with a threshold value selected by a sort code which is either derived from the arriving data cell, or has an external origin, such as a network-control system or network monitoring system located outside the admission device, and a device for thereafter issuing an admission code having a value which depends on the result of the comparison.

10 Claims, 1 Drawing Sheet

ATM POLICING DEVICE

BACKGROUND OF THE INVENTION

The invention relates to an admission device for admitting data cells, provided with VC (i.e., Virtual Channel) codes, to a transmission medium, which admission device reads out the VC code of an arriving data cell and compares a count value, which is a measure for the load of data cells with such VC codes, to a threshold value, after which an admission code is issued, the value of which depends on the result of the comparison.

In the prior-art ATM [Asynchronous Transfer Mode], such device is known under the name of "policing" device or UPC (Usage Parameter Control) device and serves to see to it that per VC no more ATM data cells are admitted to a medium (network) than a value previously set on the basis of a "traffic contract" between subscriber and network provider. All this has been laid down in ITU Recommendation I.371 "Traffic Control and Congestion Control in B-ISDN".

Earlier applications in this field were already submitted by the applicant, namely, U.S. Pat. No. 5,007,043 and U.S. Pat. No. 5,224,092, inter alia. The former, U.S. Pat. No. 5,007,043, discusses the time-shared use of a "leaky-bucket" policing device, with the VC code of an arriving data cell being read out and a counter position valid for that VC being incremented by a fixed value and decremented by a value which is higher as the load by data cells with that VC code is lower. The new counter position obtained thus according to the manner of a "leaky-bucket" operation is a measure for the cell load in such VC. A measure for the cell load may also be obtained in other ways.

If the calculated count value does not exceed a threshold value valid for that VC, the data cell is admitted to the downstream transmission medium. In the event of excess, an admission code is given to the data cell, as a result of which the cell is not admitted. Another option, which is proposed in U.S. Pat. No. 4,769,810 (AT&T), is that such cells are admitted, but that they are marked, e.g., as prescribed in the said ITU Recommendation, with a low Cell-Loss-Priority (CLP) code; in the event of congestion in the transmission medium, the marked data cells are discarded first.

Apart from this, it would also be possible not to have the updating of the counter position precede the comparison to the threshold, but to effect this afterwards, prior to the next data cell as it were.

U.S. Pat. No. 5,224,092 in the name of the applicant sees to it that not one but various counter positions are simultaneously updated and compared to as many thresholds. The advantage thereof is a great degree of freedom in monitoring of the cell flow, both by internal parameter control from the arriving data cells and by external control. The latter option is further worked out in U.S. Pat. No. 5,224,091 of the applicant.

Although U.S. Pat. No. 5,224,092 supplies a great degree of freedom, it provides for the simultaneous updating of a plurality of counter positions and the comparison to each one's "own" threshold, resulting in a corresponding number of "assessment signals" which, after processing, in turn result in a final control signal which controls the fate of the data cell (admitting, marking, refusing access). The disclosed system is therefore rather complex since separate processes are carried out in several parallel units. Inter alia, a new counter position is calculated in each unit separately.

One of the ATM applications which are important in the short term is the mutual coupling of already existing networks which are based on other techniques than ATM. In this case, conversion must take place of the data format of the existing network into the ATM data format. It has become apparent that application of the guidelines laid down in the Recommendation may turn out disadvantageously, both for the efficiency of the ATM network and for the performance as it is experienced by the user. Moreover it is possible that, even in a pure ATM network, a strict application of said guidelines in a number of special situations may result in a less desirable behaviour of the system. Several of such situations are therefore still being studied by ITU-TS. Below, some of such situations for which the present invention endeavours to supply a solution, are outlined.

a. Dealing with Cell Loss Priority (CLP)

ATM comprises two categories of loss priority (Cell Loss Priority), indicated by $CLP_0$ and $CLP_1$. The loss priority is indicated in the cell header. In the event of network congestion, cells marked with $CLP_1$ are preferably discarded, so that more space is created for the cells marked with $CLP_0$. Within one connection, cells may occur with different indications for the loss priority. The ITU Recommendation prescribes that, apart from limiting the traffic parameters (such as the maximum admissible number of cells per second) for the $CLP_0$ cells, the parameters for the total $(CLP_0+CLP_1)$ traffic of the connection, too, must be limited. As seen from the viewpoint of network resource management, this is a logical choice. The result, however, is that in a VC with both $CLP_0$ and $CLP_1$ cells, a $CLP_0$ cell may be discarded because $CLP_1$ cells already passed earlier may have brought the monitoring device to just below the critical point. Such behaviour, in which a $CLP_0$ cell is lost in favour of a $CLP_1$ cell, is contrary to the intention that $CLP_1$ cells are to be discarded first.

In addition, as a rule the principle applies that the monitoring device is permitted to discard cells only if the cell flow exceeds the agreed parameter(s): if the $CLP_0$ flow does not exceed the limit imposed, no $CLP_0$ cell should be discarded either. On this point, too, the consequence of the given guideline is not entirely in agreement with the general principle.

In the ITU study groups in question, attempts are now being made to turn back the guideline agreed earlier on the limitation of the joint $(CLP_0+CLP_1)$ cell flow and to mutate it to the separate limitation of the $CLP_1$ flow. From the viewpoint of resource management, however, this is not desirable. If $CLP_1$ cells are transmitted instead of $CLP_0$ cells, the monitoring device would then discard cells while from the viewpoint of network protection such is not at all necessary: $CLP_1$ cells are "easier" on the network since, should the occasion arise, they may (as yet) be discarded.

An object of the invention is to obviate the drawbacks outlined earlier, so that the current guideline on the limitation of the total $(CLP_0+CLP_1)$ traffic may be maintained.

b. Policing OAM and RM Cells

Apart from cells with user data, cells are also transmitted along the same virtual channel for other purposes. In particular, it concerns cells for Operation & Maintenance (OAM) and so-called "resource-management" (RM) cells. The different types of cells are recognisable by the bit pattern in the cell header. The question now is whether all these cells must be monitored as one flow or as three different flows.

In the event that it is decided to monitor each of the flows separately, this means a multiplication of the complexity of the monitoring device. After all, instead of provisions for monitoring one virtual channel, there must be provisions for monitoring a plurality of subflows within the channel. In addition, the management of a connection becomes considerably more complex. A further expansion into several subflows has not yet been provided for, but would be made almost impossible with such an approach.

The other option is to monitor only the total of the subflows. The quantity of OAM and resource-management cells is always small in comparison with the quantity of user cells. In addition, the cells follow almost the same path through the network. This argues in favour of joint monitoring. In the event that the number of user cells exceeds the limit imposed, however, it may occur that not only user cells are discarded, but also OAM and resource-management cells. The latter is not directly disastrous, but still less desirable. The invention makes a single and joint monitoring possible without this drawback.

c. Policing Bursty Data Flows

Almost all existing protocols for transferring data work with blocks of data (frames) which are considerably larger than one or a few ATM cells. The network, and therefore also the monitoring device, is then confronted with "bursts" of data. During a burst, the data cells follow one another with short intervals; between the bursts, in most cases there is much more space. Such already existing protocols carry out the error detection over an entire frame. In the event of detection of an error, the entire frame is therefore retransmitted. The result is that, due to the loss of one single ATM cell (e.g., as a result of the intervention of the monitoring device), an entire frame becomes unusable and must be retransmitted. Letting through cells belonging to the same frame after a cell has been discarded, does not make sense and is therefore inefficient. To improve this, it has been proposed that all cells belonging to the same frame and following a discarded cell, be discarded as well. At any rate, useless cells are then no longer supplied to the network. The cells transmitted prior to the discarding of the cell, however, did lay claim to the transmission capacity of the network without the frame having been successfully transferred. Another object of the invention is to make possible a further enhancing of the efficiency.

SUMMARY OF THE INVENTION

The essence of the invention is that, although a single threshold value is used for the assessment of the cell load, this threshold value is selected, depending on the type of data cell, from a multiplicity of thresholds. The threshold value is selected on the basis of one or more sort codes which either are read out by the admission device of the arriving data cell, or are supplied from outside the admission device, e.g., by a network-control system or network monitoring system located outside the admission device.

Below, it is described how the invention supplies a solution to each of the problem areas described earlier.

a. Dealing with Cell Loss Priority (CLP)

In the event of a connection in which cells with different settings of the Cell-Loss-Priority (CLP) bit may occur, regarding the limitation of the $CLP_0+CLP_1$ traffic a higher threshold value is used for the arrival of a $CLP_0$ cell than for the arrival of a $CLP_1$ cell (both belonging to the same VC and therefore provided with the same VC code). The difference between the higher and the lower threshold value need not be greater than corresponds to one single cell to achieve that a $CLP_0$ cell is never discarded in favour of a $CLP_1$ cell which was let through earlier. In doing so, it is therefore also achieved that a $CLP_0$ cell is discarded only if the pattern of arrivals of $CLP_0$ cells does not meet the specifications and is no longer affected by the arrivals of $CLP_1$ cells. In this manner, it is possible to meet the current ITU guidelines regarding UPC for cell flows with cells of both CLP values, without the drawbacks previously associated therewith. Finally note that the higher threshold value need apply only to the limitation of the aggregated ($CLP_0$+$CLP_1$) flow and not to the limitation to be carried out separately on the $CLP_0$ traffic alone. In the network, therefore, no more resources need be reserved than would otherwise be the case.

The $CLP_0$ and $CLP_1$ code therefore constitutes one of the sort codes of the data cell, on the basis of which the correct threshold value is set.

b. Policing OAM and Resource-Management (RM) Cells

If a lower threshold value is used for the ordinary user cells, and a higher threshold value for the "special" cells, such as those for OAM and resource management (RM), no special cell will be lost exclusively as a result of exceeding the permitted number of user cells. In this manner, it is possible to simply carry out the UPC function by limiting only the parameters of the total flow without the unwanted side effects described earlier. The difference between the lower and the higher threshold, partly because the share thereof is very small in comparison with the user cells, need not be greater than corresponds to the number of "special" cell flows.

Note that if, due to whatever cause, the number of "special" cells becomes too high, the higher threshold value may as yet be exceeded. In this case, "special" cells will also be discarded, but this time fully justified, in order to protect the network against overload. The joint monitoring of these flows provides a considerable simplification of the management and of the signalling required for setting the various parameters. In the simplest embodiment, the margin between the low and the high threshold value on a semipermanent basis and for all connections is chosen equal, so that the management and the signalling are still further simplified. In general, this simplification will be justified since authorisation to implement "special" cell flows in most cases is subject to standardisation procedures.

The code in the data cell which indicates that the data cell is an "ordinary", an OAM or an RM data cell, is used as one of the sort codes for setting the correct thresholds.

c. Policing Bursty Data Flows

In the event of supplying frames with data converted into ATM cells, the characterising feature is that "bursts" of cells are supplied. During a burst, the data cells follow one another with short intervals, while between the bursts (almost) no cells are supplied. A second characteristic is that the cells in one burst all belong to the same block of data (frame). The loss of one single cell from a burst makes the entire frame unusable. In such situation, monitoring with several limits may be advantageously applied. For each first cell of the frame, the lower limit is used. The subsequent action depends on the decision of the monitoring device regarding said first cell.

(a) if the first cell is not admitted, the threshold value will not be mutated;

(b) if the first cell is admitted, the threshold value will be mutated into the higher value.

Re (a) If the first cell is not admitted, a considerable proportion of the cells following shortly thereafter will be discarded as well. As a result, the network is largely freed from the supply of cells on the connection in question. A further refinement of the invention provides for switching to a zero limit if the first cell is not admitted. With the refinement, the entire burst is discarded in the event that the first cell is not admitted. The efficiency on this point is then maximal: no cells are supplied to the network while (sic) this still does not result in a successfully transferred frame.

Re (b) If the difference between the low and high limit suffices to bridge a burst from an entire block of data, the entire burst of cells will be admitted if the first cell is indeed admitted. This prevents the situation that a burst is initially admitted, but that during the burst it turns out that intervention is required. In such situation the first, already admitted part, too, would be transferred by the network in vain. With the proposed method, maximum efficiency is attained on this point, too.

The high limit functions as a safeguard against transmitting longer bursts than have been agreed, and therefore also against an ongoing stream of cells. A further refinement of the invention provides for switching to the zero limit as soon as the high threshold value has been exceeded.

The code indicating that a data cell is the first one of a "burst" (the subsequent ones therefore have a different code) is usable as one of the sort codes for selecting the correct threshold. Another option is to use a code for this purpose which indicates, on the contrary, that the data cell to which said code has been assigned is the last data cell of a frame burst; the next data cell then is the first one of the next frame.

DETAILED DESCRIPTION

Figure 1:
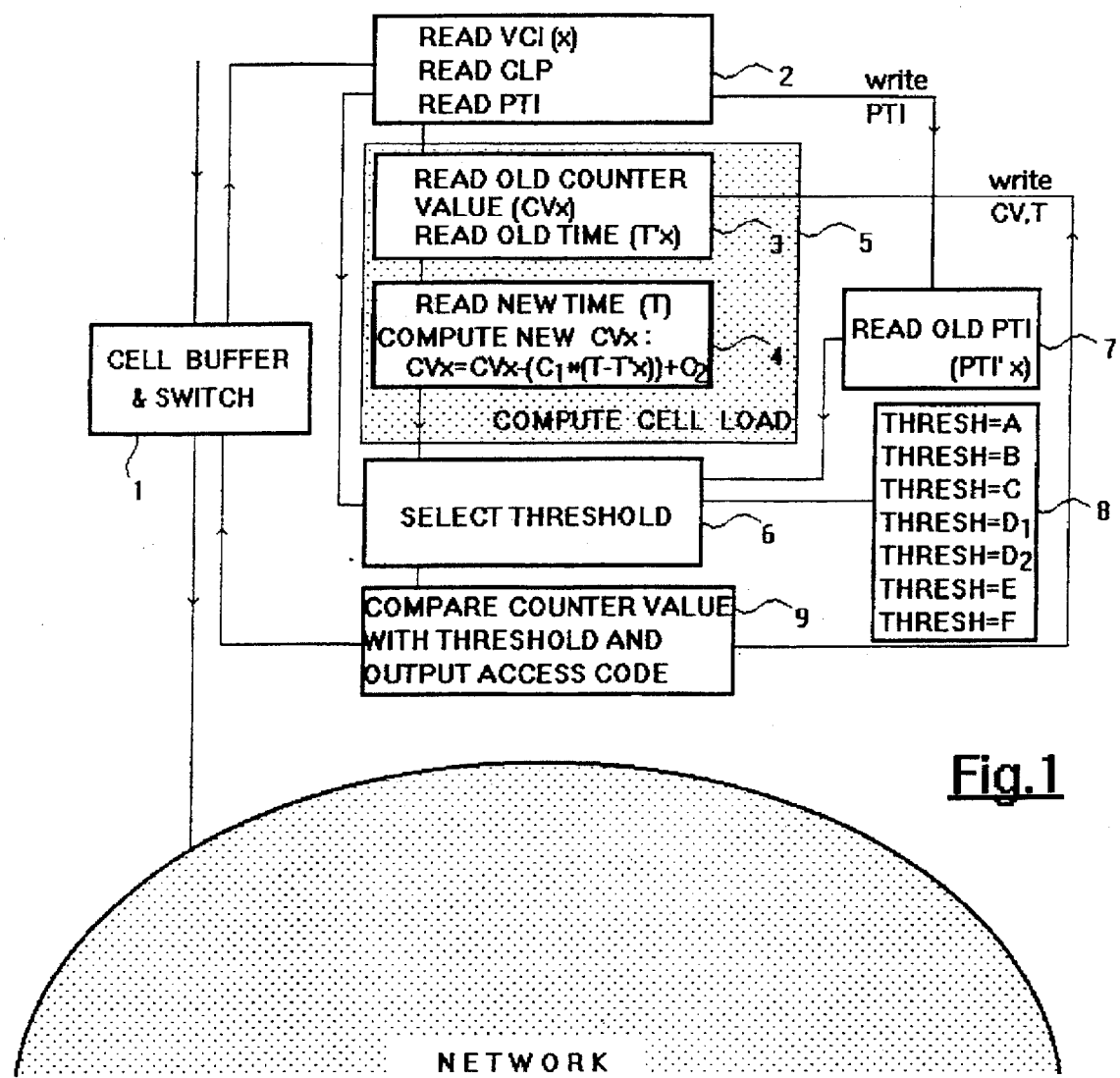
FIG. 1 shows a schematic exemplary embodiment of the invention.

An arriving data cell is temporarily retained in a buffer in a switching device 1. Of this data cell, there are read out by a reading device 2 the VC identifier (VCI=x) and the sort codes to be used as threshold-selection code, consisting of a one-bit CLP code and a three-bit PTI (Payload Type Identifier). The latter indicates whether the data cell is an OAM cell, an RM cell or an "ordinary" data cell; an ordinary cell which is the last cell of a "frame burst" is given a separate PTI code. The CLP bit is significant only for ordinary data cells. The sort codes which are of importance for the present invention are therefore two CLP and four PTI codes. In practice, seven PTI codes may occur, which are interpreted as follows:

1. Ordinary data cell with low Cell Loss Priority; not the last one of a burst:

*CLP=1 and PTI=000 or 010;*

2. Ordinary data cell with high Cell Loss Priority; not the last one of a burst:

*CLP=0 and PTI=000 or 010;*

3. Ordinary data cell with low Cell Loss Priority; last data cell of a burst:

*CLP=1 and PTI=001 or 011;*

4. Ordinary data cell with high Cell Loss Priority; last data cell of a burst:

*CLP=0 and PTI=001 or 011;*

5. OAM cell:

*CLP=0/1 and PTI=100 or 101;*

6. RM cell:

*CLP=0/1 and PTI=110.*

The load of data cells with such VC code is now calculated in a device 5, as discussed in detail in U.S. Pat. No. 5,007,043, by multiplying the difference ($\Delta T$) between the time of arrival (T) of the last data cell and that of the penultimate data cell with the same VC code ($T'_x$) by a constant ($C_1$), subtracting the outcome from the counter position stored in device 5 ($CV_x$) valid for that virtual channel (x), and adding a constant value ($C_2$) thereto. The resulting count value is a measure for the load, calculated according to the "leaky-bucket" method. Other methods are also feasible, e.g., "windowing". Below, the load value (count value) is compared with a threshold value which is selected by a device 6 on the basis of the sort codes read out by device 2—which together form a threshold-selection code—according to the table below:

IF (CLP=1) AND (PTI=000 OR PTI=010) THEN THRESH=A: REM Normal $CLP_1$ data cell; select threshold value A;

IF (CLP=0) AND (PTI=000 OR PTI=010) THEN THRESH=B: REM Normal $CLP_0$ data cell; select threshold value B;

IF (CLP=1) AND ($PTI_x$=001 OR $PTI_x$=011) THEN THRESH=C: REM $CLP_1$ data cell, first of a burst; select threshold value C; $PTI_x$ is the PTI of the penultimate data cell of the same virtual channel x;

IF (CLP=0) AND ($PTI_x$=001 OR $PTI_x$=011) THEN THRESH=D: REM $CLP_0$ data cell, first of a burst; select threshold value D;

IF (PTI=100 OR PTI=101) THEN THRESH=E; REM OAM cell; select threshold value E;

IF PTI=110 THEN THRESH=F; REM RM cell; select threshold value F.

In the foregoing, something has already been said on the height of the thresholds. Threshold value B must exceed threshold value A in order to favour $CLP_0$ data cells, which have a higher priority, over $CLP_1$ cells; the difference need not be greater than corresponds to one data cell.

Threshold value C must be low in comparison with threshold value D, so that if the first data cell of the burst is admitted (under regime of C), the remainder of the frame burst must be capable of following (under regime of D), since otherwise the frame is incomplete. If the first data cell is admitted, D is therefore greater than C. If, however, the first data cell of the burst is not admitted, neither does it make sense to admit the remainder of the data cells of the frame; for this reason, threshold value D is then set, e.g., at 0, as a result of which the cells of the remainder of the frame are certainly refused. In the FIGURE, the two values for D are represented by $D_1$ and $D_2$.

Thresholds E and F will be chosen relatively high, since it is of great importance that system-control/signalling cells (OAM and RM cells) be admitted.

As a function of the result of the comparison between the calculated count value and the selected threshold value (A . . . F), an access code is generated and supplied to device 1. If the selected threshold value is not exceeded by the (calculated) count value, the access code involves the signal that the data cell buffered in device 1 must be switched through to the network. Should the threshold value be exceeded, however, an access code is generated which is interpreted by device 1 as an instruction to discard the data cell. Another option is that, if the data cell has a $CLP_0$ priority, this is replaced by a $CLP_1$ priority, as a result of which the data cell, in conformity with U.S. Pat. No. 4,769,810 (AT&T), is marked as a data cell which in the event of network congestion may be discarded first.

It should be noted that the invention is not limited to ATM data cells, but extends to transmission systems in which data cells (data packages), provided with channel codes or similar codes, are transferred.

REFERENCES

For a correct and complete understanding of the present invention, the references mentioned are considered to be incorporated in the present application.

[1] Traffic Control and Congestion Control in B-ISDN; ITU-TS recommendation I.371; 1992

[2] U.S. Pat. No. 5,007,043

[3] U.S. Pat. No. 5,224,092

[4] U.S. Pat. No. 4,769,810

[5] U.S. Pat. No. 5,224,091.

What is claimed is:

1. For use with a transmission system, an admission device for admitting data cells provided with VC codes to a transmission medium, the admission device comprising:

means for reading out the VC code of an arriving data cell, means for comparing a count value, which is a measure of a load of the data cell with said read out VC code, with a threshold value selected from a multiplicity of thresholds, on the basis of at least one sort code, and means for thereafter issuing an admission code having a value which depends on the result of the comparison by the means for comparing.

2. An admission device according to claim 1, wherein said at least one sort code is read out from the arriving data cell.

3. An admission device according to claim 2, wherein said at least one sort code is supplied to the admission device from a device located outside the admission device.

4. An admission device according to claim 1, wherein said at least one sort code is supplied to the admission device from a device located outside the admission device.

5. For use with a transmission system, an admission device for admitting data cells provided with VC codes to a transmission medium, the admission device comprising:

means for reading out the VC code of an arriving data cell, means for comparing a count value, which is a measure of a load of the data cell with said read out VC code, with a threshold value selected from a multiplicity of thresholds, on the basis of at least one sort code, with at least part of each said sort code being a priority code, and means for thereafter issuing an admission code having a value which depends on the result of the comparison by the means for comparing.

6. An admission device according to claim 5, wherein the data cells are ATM data cells, and at least part of each said sort code is formed by a Cell-Loss-Priority (CLP) code of the data cell.

7. For use with a transmission system, an admission device for admitting data cells provided with VC codes to a transmission medium, the admission device comprising:

means for reading out the read out VC code of an arriving data cell, means for comparing a count value, which is a measure of a load of the data cell with said VC code, with a threshold value selected from a multiplicity of thresholds, on the basis of at least one sort code, with at least part of each said sort code formed by a code indicating whether the data cell is a user data cell intended for mainly transferring user information, or a system data cell intended for exclusively transferring control information or signalling information for said transmission system, and means for thereafter issuing an admission code having a value which depends on the result of the comparison by the means for comparing.

8. An admission device according to claim 7, wherein the data cells are ATM data cells, and at least part of each said sort code is formed by a Payload Type Identifier (PTI) of the data cell.

9. For use with a transmission system, an admission device for admitting data cells provided with VC codes to a transmission medium, the admission device comprising:

means for reading out the VC code of an arriving data cell, means for comparing a count value, which is a measure of a load of the data cell with said read out VC code, with a threshold value selected from a multiplicity of thresholds, on the basis of at least one sort code, with at least part of each said sort code a code indicating whether the data cell is, or is not, a last data cell from a series to one and the same frame of data cells, and means for thereafter issuing an admission code having a value which depends on the result of the comparison by the means for comparing.

10. An admission device according to claim 9, wherein the data cells are ATM data cells, and at least part of each said sort code is formed by a Payload Type Identifier (PTI) of the data cell.

* * * * *